United States Patent [19]

Holl

[11] 3,888,608

[45] June 10, 1975

[54] APPARATUS FOR THE CONTINUOUS MANUFACTURE OF ENDLESS FOAMS

[75] Inventor: Norbert Holl, Battenberg, Germany

[73] Assignee: BASF Aktiengesellschaft, Ludwigshafen (Rhine), Germany

[22] Filed: July 15, 1974

[21] Appl. No.: 488,786

[30] Foreign Application Priority Data
July 14, 1973  Germany.................... 2335892

[52] U.S. Cl................... 425/4 C; 425/817; 425/224
[51] Int. Cl....................... B29c 25/00; B29d 27/00
[58] Field of Search..................... 425/4 C, 817, 224

[56] References Cited
UNITED STATES PATENTS

| | | | |
|---|---|---|---|
| 3,761,209 | 9/1973 | Hanton | 425/4 C |
| 3,767,744 | 10/1973 | Holl | 425/4 C X |
| 3,819,781 | 6/1974 | Kornylak | 425/4 C X |
| 3,832,106 | 8/1974 | Rivat-Lahousse | 425/4 C |

*Primary Examiner*—J. Howard Flint, Jr.
*Attorney, Agent, or Firm*—Johnston, Keil, Thompson & Shurtleff

[57] ABSTRACT

Apparatus for the continuous manufacture of endless foams from prefoamed particulate plastics capable of further expansion. The plastics are passed through a heating zone and a cooling zone by means of belts defining a channel and composed of transverse strips of alternately gas-permeable and gas-impermeable materials of equal thickness. This form of the belts produces better grades of foam at higher output rates on account of the more intense and more uniform steaming achieved. The foams produced are suitable, for example, for use as insulating materials in buildings and for packaging purposes.

3 Claims, 4 Drawing Figures

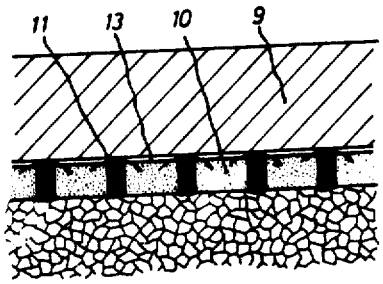
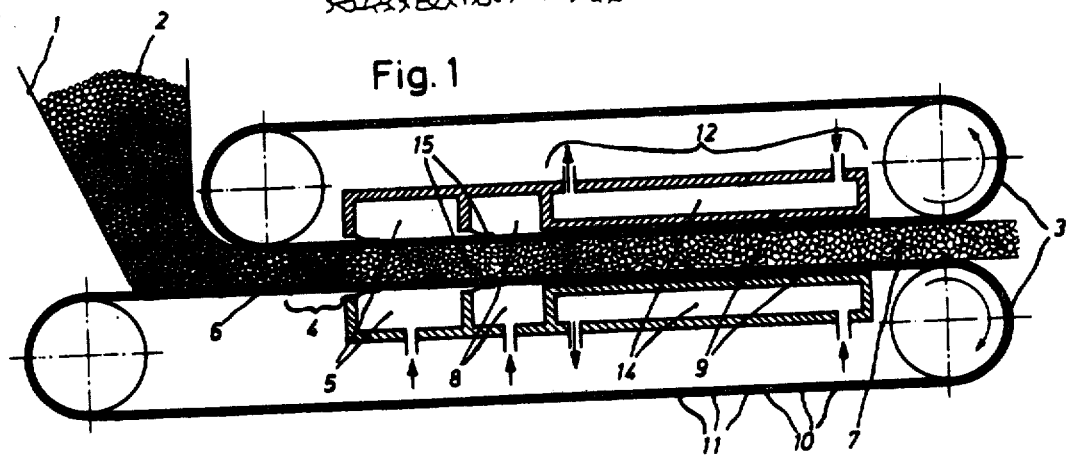
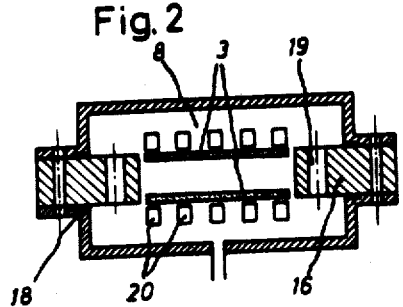
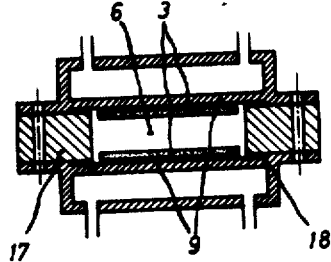

APPARATUS FOR THE CONTINUOUS MANUFACTURE OF ENDLESS FOAMS

This application discloses and claims subject matter described in German Patent Application No. P 23 35 892.1, filed July 14, 1973, which is incorporated herein by reference.

This invention relates to an apparatus for the continuous manufacture of endless foams from prefoamed particulate plastics capable of further expansion and consisting of means for filling the prefoamed particles into a channel formed by moving gas-permeable walls and stationary side walls and extending from said filling means over a heating zone and cooling zone, said moving gas-permeable walls being composed of endless moving belts.

Foamed plastics, for example polystyrene foams, are usually manufactured from prefoamed polystyrene particles, i.e. particles which have been foamed to a certain extent but still contain expanding agent and are thus still capable of further expansion, which particles are placed in molds having perforated inner walls, whereupon steam is passed through the mold at a pressure of from 0.5 to 1.2 atmosphere gage to complete foaming of the particles, which means that these particles expand further and become fused together under the internal pressure of expansion. In prior art apparatus for the continuous formation of coherent foamed articles from foamable plastics particles, the said particles are transported between perforated steel belts into a chamber filled with steam, in which the particles are heated. The steam passes through the belts and between the particles of plastics to form coherent foams. In the subsequent cooling zone consisting of a number of pairs of opposing chambers, the foaming pressure gradually falls due to diffusion and cooling. Compressed air fed into the first pair of cooling chambers also passes successively through the other pairs of cooling chambers in the direction of movement of the foam (machine direction). Thus the air pressure automatically reaches a state of equilibrium with the foaming pressure with the result that there are no or only minimum friction forces between the pressure-free moving belts and the stationary chamber elements.

However, perforated steel belts tend to form corrugated distortions, mainly over the marginal regions, particularly when superposed mechanical and thermal stresses of an irregular nature occur. This unevenness of the belts causes high steam losses. This in turn not only increases the energy costs but also produces foams ahowing non-uniform fusion, particularly at the edges. Another disadvantage is that the total free area of the steel belts for the passage of gases must be low for reasons of strength and this leads, in particular, to unfavorable flow conditions during steaming and subsequent pressure decline in the foams and also to longer cooling times.

We have now found an apparatus of the above kind for the continuous manufacture of endless foams, which avoids the above drawbacks and which is characterized in that the belts are composed of transverse strips alternately of gas-permeable and gas-impermeable materials of equal thickness. In an advantageous embodiment, the belts are composed of metal tageous gauze having transverse rubber strips vulcanized therein.

Using these measures it is possible to reduce the cooling zone to one pair of cooling chambers without doing away with the principle of automatic air equilibrium. The free areas of the belts composed of metal gauze, which give a total free area which is from 10 to 20 times greater than that of conventional perforated steel belts, provide more intense and more uniform steaming to produce better foam qualities and also make it possible to increase the output of the equipment due to quicker decline of the foaming pressure in the cooling zone. Such depressurization may be further accelerated by indirect cooling. Furthermore, it is possible to guide the belts, mechanically, in a particularly simple manner by the provision of side strips, whereas the course of the conventional perforated steel belts has to be controlled manually or by complicated means, for example means for changing the position of the axle of the guide roller. Another advantage is the fact that the transverse gas-impermeable strips, which are essential for achieving a balance between the gas pressure and the foaming pressure, are subjected to virtually no wear.

The belts of the invention substantially consist of a metal gauze having a thickness of about 5 mm and made of wire of rectangular cross-section, mainly measuring 1.4 × 0.7 mm. Transverse strips of rubber or rubbery material having a width of about 5 mm and optionally containing additives have been vulcanized into said metal gauze to be firmly anchored to the surface thereof. These strips are spaced at intervals of from 5 to 30 mm. The type of weave (herringbond weave) and the rectangular cross-section of the wire produce narrow gaps in the surface of the belt. The softened foamed particles cannot pass through these gaps but the surface of said particles may mesh with said gaps.

According to a further feature of the invention, the belts converge on each other in the machine direction, the angle of convergence being dependent on the thickness of the continuous foam, on the compression ratio and on the length of the apparatus.

By way of example, one embodiment of the apparatus of the invention is further described below and is diagrammatically illustrated in the accompanying drawings, in which FIG. 1 is a side view of the apparatus, FIG. 2 is a cross-section through the pair of chambers to which compressed gas is passed, FIG. 3 is a cross-section of the cooling channel and FIG. 4 shows a portion of the cooling zone.

The prefoamed polymer particles 2 are fed through the funnel 1 to the space between the moving belts 3. In the pressurizing zone 4, the polymer particles are heated by the steam fed to the steaming chambers 5 and passing to the channel 6 through the perforated belts 3. Further foaming of the particles takes place and the particles are fused together to form a barrier for the steam, with the result that the steam cannot escape from the channel 6 countercurrently to the machine direction. Thus, as the particles pass the steaming chambers 5, a coherent foam 7 having an internal foaming pressure is formed between the two moving belts.

The foam 7 then passes a pair of chambers 8 to which a gaseous medium such as air is pumped. This air flows out of the apparatus into the atmosphere in the direction of movement of the foam, its route being between the moving belts and the stationary guide plates 9. The moving belts 3 are composed of gas-permeable transverse strips 10 alternating with gas-impermeable transverse strips 11 of the same thickness. The transverse gas-impermeable strips 11 prevent uncontrolled escape of the air fed to the foam to compensate the foaming pressure and subdivide the belts 3 into "chamber-like" sections in the longitudinal direction.

The air fed to the chambers 8 to compensate the foaming pressure can escape into the atmosphere only in the machine direction between the stationary walls 9 and the moving belts 3, since the distance strips 16 and 17 and the sealing elements 18 form a laterally gas-impermeable channel 7 with the chambers 8 and the walls 9.

The air pressure in the chamberlike air-permeable transverse strips automatically reaches a state of equilibrium with the foaming pressure in the continuous foam 7. A dynamic equilibrium between the air pressure and the foaming pressure is produced at all points along the cooling zone 12 receiving compressed air. For example, if the foaming pressure should fall, the air pressure will be momentarily excessive and will thus cause brief compression of the elastic foam 7 according to the pressure difference. The gap 13 widens to the same extent and thus allows an increased flow of air of the next air-permeable chamberlike transverse strip until the air pressure has become equal to the reduced foaming pressure. Conversely, if the foaming pressure exceeds the air pressure, the gap 13 is constricted and the constant flow of air is held back until it reaches the value of the local foaming pressure. The friction forces between the moving belt 3 and the stationary walls 9 are negligibly small, since the air in the gap 13 prevents all mechanical friction.

The foaming pressure in the continuous foam reaches a peak value when passing from the steaming chamber 5 to the chamber 8. Since the air in the prefoamed particles is heated during steaming and thus expands and also the residual expanding agent therein reacts, the maximum foaming pressure is from 1.2 to 1.4 times the steam pressure. The foaming pressure falls to atmospheric as a result of diffusion and cooling in the cooling zone 12.

The decline of foaming pressure may be accelerated by using a coolant agent, for example water having a temperature of from 5° to 25°C and passed through the cooling chamber 14 countercurrently. The heat of the continuous foam 7 is transferred to the fixed walls 9 via the moving belts 3 and the turbulent stream of air, and this heat is then removed by the cooling agent in chamber 14. This is indirect cooling, i.e. the coolant does not come into direct contact with the foam 7.

The air pressure in chamber 8 is set at a higher value than the maximum foaming pressure. The pressure differential between the steaming chamber 5 and the chamber 8 actuates the lip seal 15 to prevent the compressed air from passing into the streaming chamber 5 counter to the machine direction. The sealing lip 15 must be broader than the transverse gas-permeable strips of the moving belts.

To achieve a uniform pressure distribution in chambers 8, the distance pieces 16 are provided with overflow ducts 19. Advantageously, the distance strips 16 and 17 are exchangeable to enable continuous foams 7 of different thicknesses to be manufactured using one and the same plant.

I claim:

1. An apparatus for the continuous manufacture of endless foams from prefoamed particulate plastics capable of further expansion and consisting of means for filling the preformed particles into a channel formed by moving gas-permeable walls and stationary side walls and extending from said filling means over a heating and a cooling zone, said moving gas-permeable walls being composed of endless belts, wherein the belts are composed of transverse gas-permeable strips alternating with transverse gas-impermeable strips of the same thickness.

2. An apparatus as claimed in claim 1, wherein the belts consist of a metal gauze having rubber strips vulcanized therein in the transverse direction.

3. An apparatus as claimed in claim 1, wherein the belts converge on each other in the machine direction.

* * * * *